US010016789B2

(12) United States Patent
Eger

(10) Patent No.: US 10,016,789 B2
(45) Date of Patent: Jul. 10, 2018

(54) DYNAMICALLY CONTROLLING SORTING BIN AND CONTAINER FILLING IN A SORTING MACHINE

(71) Applicant: Siemens Industry, Inc., Alpharetta, GA (US)

(72) Inventor: Tamas Eger, Arlington, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 60 days.

(21) Appl. No.: 15/224,913

(22) Filed: Aug. 1, 2016

(65) Prior Publication Data

US 2018/0029082 A1 Feb. 1, 2018

(51) Int. Cl.

| | |
|---|---|
| ***G06F 7/00*** | (2006.01) |
| ***B07C 3/00*** | (2006.01) |
| ***B07C 3/02*** | (2006.01) |
| ***B65H 31/02*** | (2006.01) |

(52) U.S. Cl.

CPC ................ *B07C 3/006* (2013.01); *B07C 3/02* (2013.01); *B65H 31/02* (2013.01); *B65H 2405/20* (2013.01); *B65H 2701/1916* (2013.01); *B65H 2801/78* (2013.01)

(58) Field of Classification Search

None

See application file for complete search history.

(56) References Cited

U.S. PATENT DOCUMENTS

| | | | | |
|---|---|---|---|---|
| 5,544,466 | A * | 8/1996 | Bonnet | B65B 39/00 53/138.7 |
| 6,365,862 | B1 | 4/2002 | Miller et al. | |
| 6,799,671 | B1 * | 10/2004 | Sanchez Gomez | B65G 1/1371 198/349 |
| 7,112,031 | B2 | 9/2006 | Harres | |
| 7,156,220 | B2 | 1/2007 | Olson et al. | |
| 8,432,280 | B2 | 4/2013 | Conklin | |
| 8,556,260 | B2 * | 10/2013 | Stemmle | B07C 3/02 271/265.04 |
| 2004/0245157 | A1 * | 12/2004 | Stone | B07C 3/02 209/552 |

* cited by examiner

*Primary Examiner* — Yolanda Renee Cumbess

(57) ABSTRACT

A sorting system and method. A method includes receiving a plurality of items to be sorted. The method includes assigning a sort criterion to each of a plurality of bins and measuring and storing at least a thickness of each of the items. The method includes assigning each of the items to a bin based on the sort criterion assigned to the respective bins. The method includes transporting each of the items to a respective bin based on the assignments. The method includes determining that the items being transported to a first bin will cause the first bin to reach a capacity threshold based on the stored thicknesses or volume of the items being transported to the first bin. The method includes, in response to determining that the items being transported to the first bin will cause the first bin to reach the capacity threshold, assigning the first criterion to a second bin.

18 Claims, 3 Drawing Sheets

FIGURE 1

DYNAMICALLY CONTROLLING SORTING BIN AND CONTAINER FILLING IN A SORTING MACHINE

TECHNICAL FIELD

The present disclosure is directed, in general, to mail processing techniques.

BACKGROUND OF THE DISCLOSURE

Mailpieces, such as flats, envelopes, and parcels, are typically sorted by automated sorters by being conveyed into respective bins or containers according to the sortation method. Inefficiencies arise when these bins near capacity during the sort process and must be replaced.

SUMMARY OF THE DISCLOSURE

Various disclosed embodiments include a sorter system for items. The sorter system includes a transport system configured to transport items to a plurality of bins based an assignment by a control system. The sorter system includes a sensor configured to detect and store at least the thickness of each item being transported. The control system is configured to assign a sort criterion to each of the plurality of bins, including assigning a first sort criterion to a first bin of the plurality of bins control system is configured to assign each of the items to one of the bins based on the sort criterion assigned to the respective bins, including assigning a plurality of items to the first bin based on a first sort criterion control system is configured to determine that the items being transported to a first bin will cause the first bin to reach a capacity threshold based on the stored thicknesses of the items being transported to the first bin control system is configured to in response to determining that the items being transported to the first bin will cause the first bin to reach a capacity threshold, assign the first criterion to a second bin of the plurality of bins.

In various embodiments, the control system also detects activation of a first switch of the first bin and the activation of the first switch indicates that a fill level of the first bin is nearing capacity. In various embodiments, the sorter system reads sort data from each item and assigns the respective item to a bin based on the sort data matching the assigned sort criterion for that bin. In various embodiments, the sorter system determines that the first bin is nearing a capacity threshold. In various embodiments, the sorter system determines that the first bin is nearing the capacity threshold based on detecting activation of a first switch of the first bin. In various embodiments, the sorter system determines that the first bin is nearing the capacity threshold based on an accumulated thickness of all items that have been transported to the first bin. In various embodiments, when the first criterion is assigned to the second bin of the plurality of bins, the sorter system signals that the first bin is full. In various embodiments, after the first criterion is assigned to the second bin of the plurality of bins, the sorter system assigns items to the second bin based on the first sort criterion. In various embodiments, the items include envelopes or magazines. In various embodiments, the sorter system calculates a cubic volume of each of the items based on at least the thickness of each item, and determining that the items being transported to a first bin will cause the first bin to reach a capacity threshold is based on the cubic volume of the items being transported to the first bin. In various embodiments, each of the items is either a flat or a parcel.

In another embodiment, a method includes receiving a plurality of items to be sorted. The method includes assigning a sort criterion to each of a plurality of bins, including assigning a first sort criterion to a first bin of the plurality of bins. The method includes measuring and storing at least a thickness of each of the items. The method includes assigning each of the items to a bin based on the sort criterion assigned to the respective bins, including assigning a first item to the first bin based on the first sort criterion. The method includes transporting each of the items to a respective bin based on the assignments, including transporting a plurality of items to the first bin based on the assignments. The method includes determining that the items being transported to the first bin will cause the first bin to reach a capacity threshold based on the stored thicknesses of the items being transported to the first bin. The method includes, in response to determining that the items being transported to the first bin will cause the first bin to reach the capacity threshold, assigning the first criterion to a second bin.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
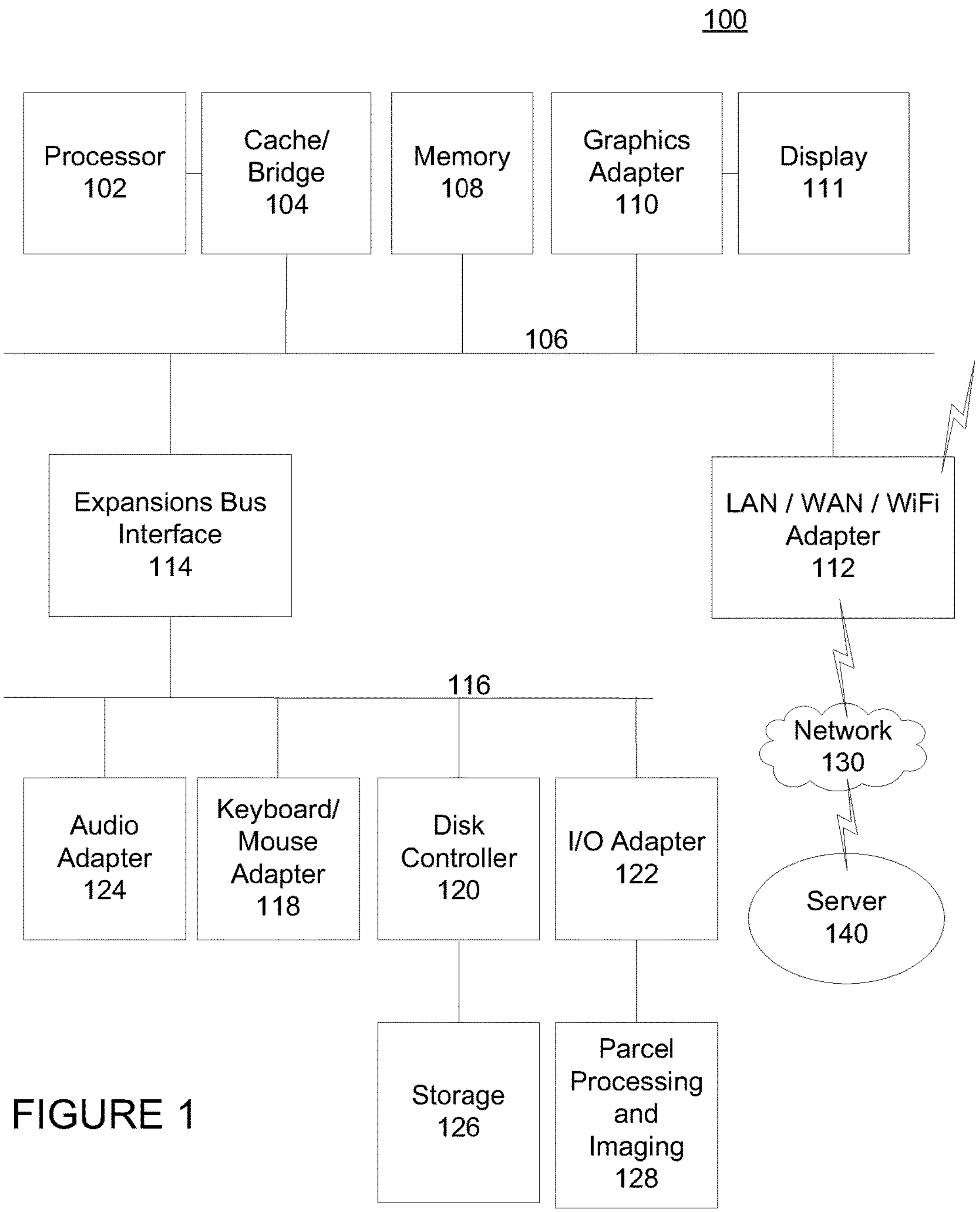
FIG. 1 depicts a block diagram of a data processing system in which an embodiment can be implemented.
Figure 2:
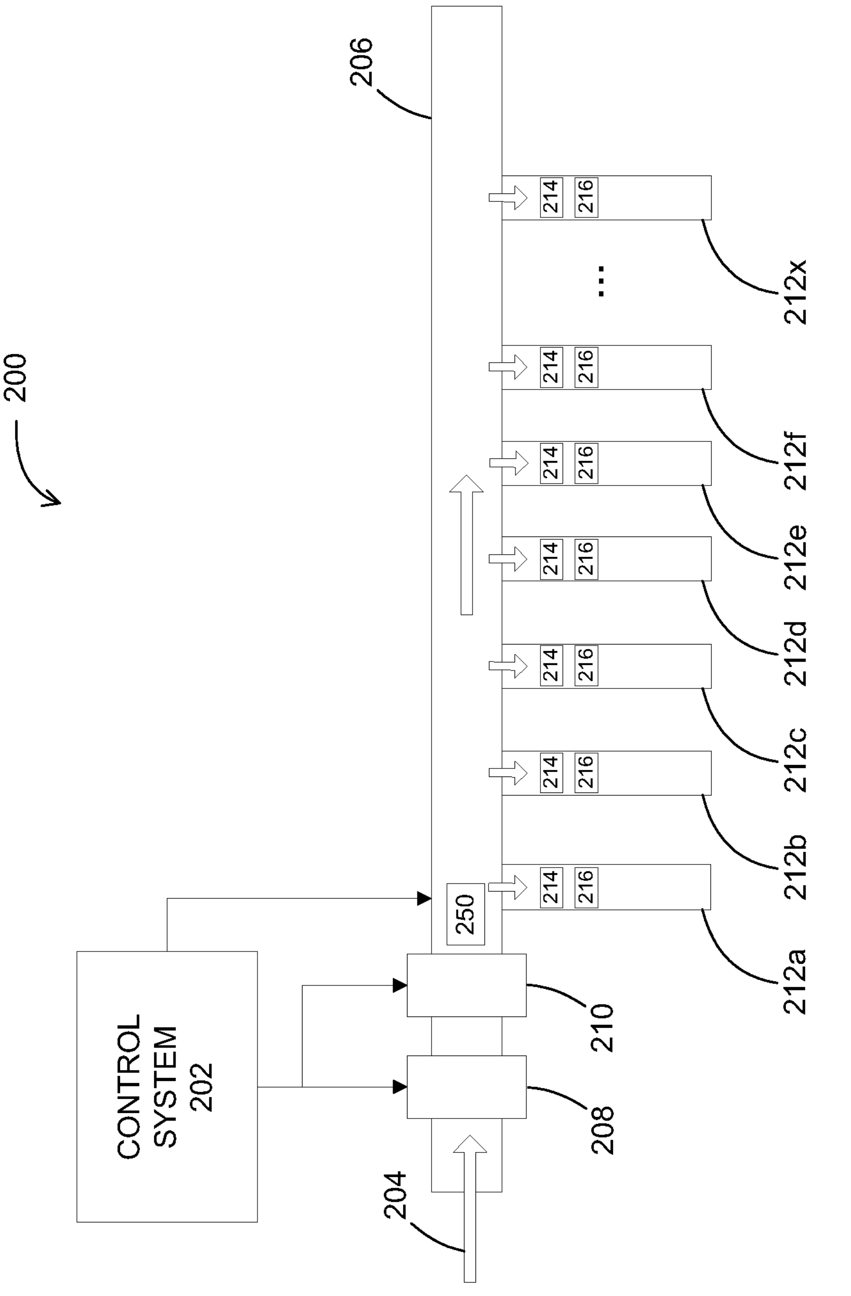
FIG. 2 depicts a schematic view of a sorting system according to disclosed embodiments.
Figure 3:
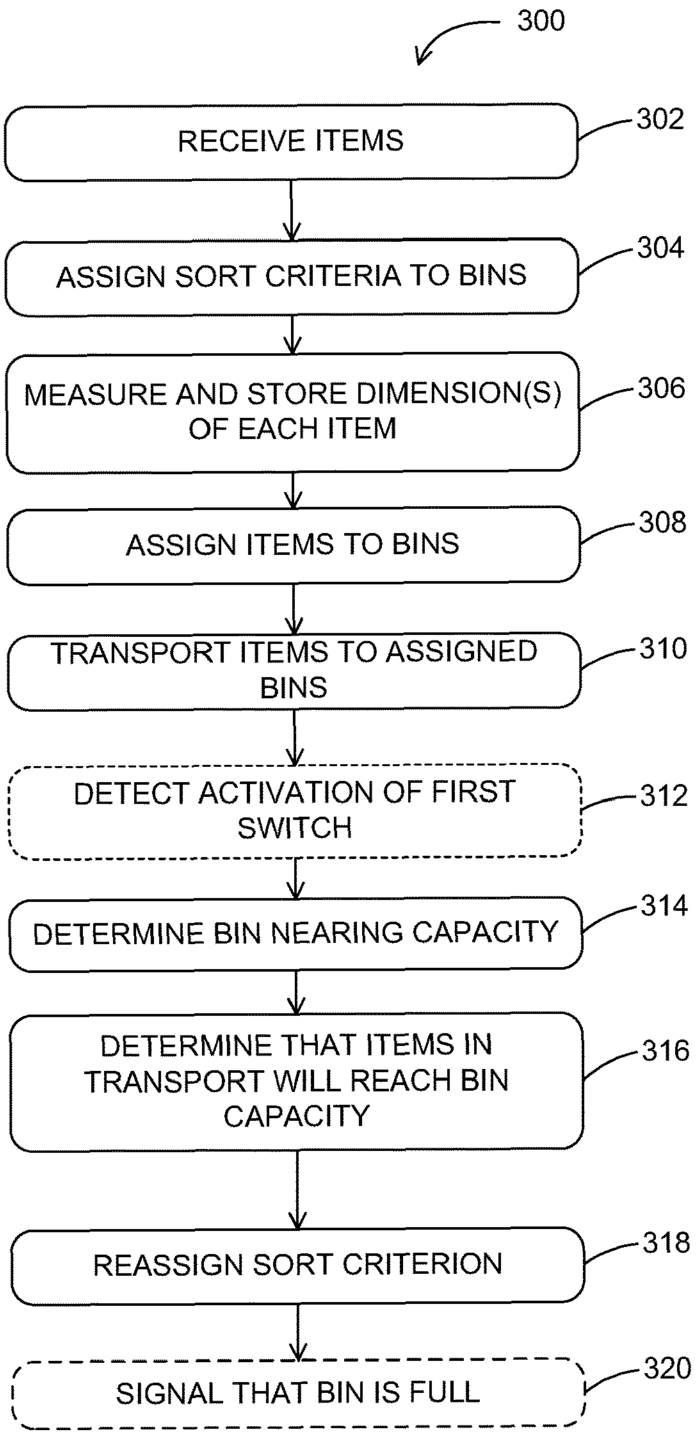
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In typical sorting of postal mail, a hierarchical structure of geographic designators is used to sort and transport items in multiple stages of distribution (sorting) and transportation (moving) within the system. An example of such a hierarchical structure is seen in the sequence from nation, to state, to county, to city, to street, to address, and finally to the recipient. Postal coding techniques, such as the ZIP code used in the United States, include hierarchical geographic information.

Sorting systems for flat articles, such as letter envelopes and magazines, typically process stacks of substantially-flat articles (or simply "flats"). Individual flats items are processed sequentially, first by reading the recipient's address, and then sorting them according to recipient address geographic hierarchy to a plurality of sorting "bins," which can be implemented as movable containers or stationary fill areas that can later be emptied. After each sort pass, the output of each sorting bin constitutes stacks of flat articles that share the same geographic area according to the level within the hierarchy. The capacity of the sorting bins is limited, such that sorted stacks must be periodically unloaded. Similarly, packages and parcels can be sorted to bins with limited cubic capacity.

Disclosed embodiments include systems and methods for effectively predicting when a bin will be filled so that it can be emptied ("swept") or exchanged. During this process for a given bin, as it becomes filled, another bin may be dynamically assigned to the same geographic area (or other sort criterion) as the filled bin, so that there is no delay in sorting the items while the original bin is being swept or exchanged. By predicting when such an exchange and reassignment will occur, disclosed embodiments improve the sorter by ensuring that items in the process of being sorted are routed correctly during the sweeping process. The items, in various embodiments, can include simply flats, parcels (any non-flat item that is processed as described herein), or a combination of these.

Disclosed embodiments employ predictive container capacity estimates by measuring one or more key product characteristics that has direct bearing on the holding capacity of the swapped final containers, is directly applicable to a wide array of sorting or routing applications, with any sorted product. Measured item characteristics might be very simple, such as a single dimension or weight, or include their derived combinations (such as footprint, volume), but may also include more qualitative characteristics (e.g. detecting strapped items, crumpled or folded pieces, unusual shapes, etc.). The disclosed techniques for predictive estimation of total remaining sort outlet/container capacity including totals from tracked work items in process, and re-calibrating the estimates based on a simple feedback trigger device at the sort outlet, is applicable regardless of the specific item characteristic being measured.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to sorter 128, as described herein, to dimension, sort, transport, and otherwise process the items in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

During the sort process as described above, the sorted items unloaded from bins are transferred to containers, whose capacity is also fixed, such that several containers may contain mail that has been transferred from the same sorting bin. Containers can transported within the facility to individual systems associated with geographic areas, where containers with similar contents have also been shipped, and where subsequent processing of a more dense concentration of regionally similar mail takes place. Since the containers are of a fixed size, the efficiency of the overall system is dependent on the consistent fill rate of the containers.

Various means are used to detect that the sorting bin's contents are reaching or have reached the capacity of the bin. Some implementations include a switch that is activated when a stack reaches a depth that is near to the bin's mechanical limit on capacity. When such a switch is activated, indicating that the stack in the given bin is near its maximum capacity, the system generates a signal to unload the bin and transfer its contents to a container. It may be necessary to prevent item items from being delivered to the filled (or nearly filled) bin during sweeping.

To prevent the possibility of delivering items to a bin while the bin is being swept, a process can include:

1.) Maintain one or more unallocated sorting bins.
2.) Sense that an active sorting bin is near its capacity limit.
3.) Allocate an unused bin.
4.) Transfer bin decisions for sort criterion from the bin being swept to the newly allocated bin.
5.) Allow for items in process that were designated to the bin that is to be swept to arrive at the bin that is to be swept.
6.) Deallocate the bin being swept.
7.) Sweep the bin.

In such an implementation, the placement of the switch to detect that the flats or parcels in the sorting bin is near the limit of capacity is designed so that when the stack reaches that point, there will be capacity remaining to accommodate the likely remaining items in the transport that have already been destined for the bin in question. The placement of the near capacity switch thus determines the remaining capacity, at which point there is not space to accommodate any further items directed to the sorting bin. A second switch at the capacity limit signals to the control system to require that any further items in the transport that have yet to arrive will bypass the intended destination sorting bin, and can proceed to a reject bin at the end of the line of sorting bins.

FIG. 2 illustrates a schematic example of a sorter system 200 in accordance with disclosed embodiments. In this example, a control system 202 controls the sorting operation, and can be generally implemented using a data processing system 100 as described herein. Items 250 are received at input 204, typically as an input stack or a parcel stream, and are transported by transport 206. As the items 250 are transported, they are "read" by reader 208 to produce sort data, such as by detecting a destination address, ZIP code, bar code, or other information on each item by imaging or otherwise. The control system 202 uses the sort data to transport each item 250 to the correct output bin 212*a-x*.

As the items 250 are transported, they are also measured by a sensor 210 to detect physical dimensions, including in particular the thickness of each item 250.

Bins 212*a-x* (collectively, bins 212) collect the sorted items 250 until each bin is at or near capacity and needs to be swept. As described herein, each of the bins 212 can include a first switch 214 that is activated when the bin is nearing capacity, and a second switch 216 that is activated when the bin is substantially full or at capacity. Switches 214 and 216 can be implemented by any mechanical, optical, or other sensor that can determine when the fill level of the respective bin has reached the respective thresholds.

The bins 212 can each be assigned to a respective sort criterion by control system 202, such as a geographic area, portion of a ZIP code, or otherwise, and one or more bins may be assigned as a special-purpose bin, such as a reject bin. At any given time, one or more bins 212 can be unassigned and available for dynamic assignment by the control system 202.

The capacity between the near limit (such as detected by switch 214) and the limit (such as detected by switch 216) is a reserve, which should accommodate all items in the sorter system 200 that have already been directed to the bin. If this capacity is inadequate, items will be rejected, and productivity is lost. If this capacity is excessive, the bin will be swept into a tray that will be less than full, and shipment efficiency and cost is negatively affected.

There are two generally ambiguous aspects that make determining this capacity reserve a difficult problem. First, the number of items that remain in the processing system that may already be directed to the bin at the point in which the near capacity limit is reached is unpredictable. Second, the thickness of the flat articles, or cubic volume of other items, that are still being transported that may already be directed to the bin at the point in which the near capacity limit is reached is unpredictable.

As a result, systems will reject items that could have been sorted, and create bins that are less than full.

Disclosed embodiments improve the sorter system 200 by accurately controlling the filling of bins without causing rejects. This is accomplished by utilizing information from a thickness measurement device, such as sensor 210. According to disclosed embodiments, the thickness of each item is measured, or all dimensions are measured for parcels, and the information is retained by control system 202 and associated with the items as they are read and assigned to each bin 212. In other embodiments, instead of just the thickness of each item being measured, multiple physical dimensions of the article can be measured and a shape profile of the item can be determined. Switches 214 and 216 that signal that the already-sorted items in the bin is near or at the capacity limit can also be used, with a relatively large reserve capacity that would normally result in no rejects due to inadequate capacity, but significant incomplete filling of bins.

When a stack of items 250 in the bin reaches the near capacity limit, the control system 202 recognizes the remaining stack capacity in the bin and accumulates the thickness or cubic volume of the items 250 already in the transport 206 directed to that sorting bin. Subtracting the accumulated thickness or volume of those items from the capacity remaining yields the unambiguous remaining capacity of the bin. The thickness of subsequent flat items, or volume of parcels, that would be directed to the bin is subtracted from the calculated remaining capacity, and if there is adequate capacity, the item is directed to the bin. When the thickness of the flat item or volume of the parcel being directed to a bin exceeds the remaining capacity, the bin is made inactive and the destination is reassigned to an unallocated sorting bin. When the last item has reached the now inactive sorting bin, a signal is given to sweep the pocket.

Control system 202 receives and maintains the thickness or other dimensions of each item 250 and maintains the destination sort bin 212 for each item 250 on at least a temporary basis. Control system can maintain a total or accumulated thickness of all items 250 that have been sorted (or are being transported to) a given bin 212, or the total thickness of all items 250 that are being transported to a given bin 212 after the first switch 214 has been activated. Control system 202 can maintain the total thickness capacity of each bin 212 or the thickness capacity between switch 214 and switch 216 for each bin.

When control system 202 determines that the accumulated thicknesses or volume of all items 250 in transport to a given bin 212 will reach the capacity of that bin, the control system can dynamically reassign the sort criterion for that bin to a new bin such that all further items 250 that meet the sort criterion are sorted to the new bin.

FIG. 3 illustrates a process in accordance with disclosed embodiments that can be performed, for example, by a sorter system 200 as disclosed herein, referred to generically as the "system" below.

The system receives a plurality of items to be sorted (302).

The system assigns a sort criterion to each of a plurality of bins (304). This includes assigning a first sort criterion to a first bin of the plurality of bins.

The system measures and stores at least a thickness of each of the items (306). In various embodiments, the system can measure and store some or all dimensions of the items or create a shape profile, and can compute a cubic volume of each of the items.

The system assigns each of the items to a bin based on the sort criterion assigned to the respective bins (308). This step can include reading sort data from each item and assigning the respective item to a bin based on the sort data matching the bin's assigned sort criterion. This includes assigning a first item to the first bin based on the first sort criterion.

The system transports each of the items to a respective bin based on the assignments (310)

The system can detect the activation of a first switch of the first bin (312). The first switch, in this example, indicates that the fill level of the first bin is nearing capacity.

The system can determine that the first bin is nearing a capacity threshold (314). This can be determined based on the detection of the activation of the first switch, or can be determined based on a total accumulated thickness or volume of the items already sorted to the first bin.

The system determines that the items being transported to the first bin will cause the first bin to reach a capacity threshold based on the stored thicknesses or volume of the items being transported to the first bin (316). This determination can be performed based on the accumulated thicknesses or volume of all items that have been sorted to the first bin, or can be performed based on determining that the first bin is nearing a capacity threshold.

In response to determining that the already-sorted items being transported to the first bin will cause the first bin to reach a capacity threshold, the system assigns the first criterion to a second bin (318).

The system can signal that the first bin is full (320). This can include causing to the first bin to be automatically swept or exchanged. The system thereafter transports the items to the second bin based on the first sort criterion.

Of course, this process can be performed for each of the bins in turn. In this way, the sorter system is improved by automatically and dynamically reassigning the bin associated with a sort criterion whenever a bin is filled, taking into account the thicknesses or volume of the items already in transport.

Disclosed embodiments provide a number of technical improvements to the sorter system. Such an improved sorter system provides significant benefits, in particular in sorting/routing applications where one or more of the following conditions. Disclosed embodiments improve systems where one or more of the following technologies are in use, making dynamic allocation of sort outlets and/or processing equipment especially practical: automated sort-bin sweeping, automated container swap-out, automatic label printing/applicator, electronic destination-display identification at each sort outlets, and/or on portable mobile devices. Disclosed embodiments improve systems that use applications where maximizing the product content of each finalized output container, thus minimizing the total number of finalized containers, is especially important. Applications with particularly significant financial impact include those where the sorted product containers are subsequently stored, transported, and/or rehandled in subsequent operations.

Disclosed embodiments improve systems with a complex (multi-level, multi-tiered, multi-pass, or geographically dispersed) sort-routing network, with significant time delay between the earliest sort/routing divert decision and arrival at the final destination. Disclosed embodiments improve systems that have applications where a significant number of work-in-process sort products exist between the initial induction/identification point and one or more of the final sort destinations. Disclosed embodiments improve systems that have applications where the finalized containers have limited capacity, where swap-out is a frequently necessary occurrence. Disclosed embodiments improve systems that have applications where the product flow rate is especially rapid, or the swap-out time of the finalized container or processing equipment is relatively lengthy, with swap-outs representing a significant loss in sorting-, routing-, or processing-capacity.

Disclosed embodiments improve systems that have applications where re-handling of sort-reject product is especially costly (e.g. linear sorters without the ability to recirculate, sequencing applications where re-introducing out-of-sequence product is not feasible, etc.). Disclosed embodiments improve systems that have applications where minimizing the number of sort outlets (total sorter size) is especially attractive.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art. Further, the various steps described herein can be omitted or performed repeatedly, successively, concurrently, or in a different order in various embodiments.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke of 35 USC § 112(f) unless the exact words "means for" are followed by a participle.

What is claimed is:

1. A sorter system for items, comprising:

a transport system configured to transport items to a plurality of bins based an assignment by a control system;

a sensor configured to detect the at least a thickness of each item being transported; and the control system configured to:

calculate a cubic volume of each of the items based on at least the thickness of each item;

store the detected thicknesses and calculated cubic volumes of each item being transported;

assign a sort criterion to each of the plurality of bins, including assigning a first sort criterion to a first bin of the plurality of bins;

assign each of the items to one of the bins based on the sort criterion assigned to the respective bins, including assigning a plurality of items to the first bin based on a first sort criterion;

estimate remaining capacity of a first bin based on the stored cubic volumes of the items being transported to the first bin;

determine that the items being transported to the first bin will cause the first bin to reach a capacity threshold based on the stored cubic volumes of the items being transported to the first bin;

in response to determining that the items being transported to the first bin will cause the first bin to reach a capacity threshold, assign the first criterion to a second bin of the plurality of bins;

detect activation of a first switch of the first bin and of a second switch of the first bin, wherein the activation of the first switch indicates that a fill level of the first bin is nearing capacity and the activation of the second switch indicates that the fill level of the first bin has reached capacity; and calibrate the estimated remaining capacity based on the detected activation of the first switch and the second switch.

2. The sorter system of claim 1, wherein the sorter system reads sort data from each item and assigns the respective item to a bin based on the sort data matching the assigned sort criterion for that bin.

3. The sorter system of claim 1, wherein the sorter system determines that the first bin is nearing a capacity threshold.

4. The sorter system of claim 3, wherein the sorter system determines that the first bin is nearing the capacity threshold based on detecting activation of a first switch of the first bin, and the sorter system further determines that the first bin has reached capacity based on detecting activation of a second switch of the first bin.

5. The sorter system of claim 3, wherein the sorter system determines that the first bin is nearing the capacity threshold also based on an accumulated thickness of all items that have been transported to the first bin.

6. The sorter system of claim 1, wherein when the first criterion is assigned to the second bin of the plurality of bins, the sorter system signals that the first bin is full.

7. The sorter system of claim 1, wherein after the first criterion is assigned to the second bin of the plurality of bins, the sorter system assigns items to the second bin based on the first sort criterion.

8. The sorter system of claim 1, wherein each of the items is either a flat or a parcel.

9. The sorter system of claim 1, wherein when the sorter system detects the activation of the second switch of the first bin, the sorter system transports further items that are already in transport and assigned to the first bin to a reject bin.

10. A method for processing items by a sorter system, comprising:

receiving a plurality of items to be sorted;

assigning a sort criterion to each of a plurality of bins, including assigning a first sort criterion to a first bin of the plurality of bins;

measuring and storing a thickness of each of the items;

calculating and storing a cubic volume of each of the items based on at least the thickness of each item;

assigning each of the items to a bin based on the sort criterion assigned to the respective bins, including assigning a first item to the first bin based on the first sort criterion;

transporting each of the items to a respective bin based on the assignments, including transporting a plurality of items to the first bin based on the assignments;

estimating remaining capacity of the first bin based on the stored cubic volumes of the items being transported to the first bin;

determining that the items being transported to the first bin will cause the first bin to reach a capacity threshold based on the stored cubic volumes of the items being transported to the first bin;

in response to determining that the items being transported to the first bin will cause the first bin to reach the capacity threshold, assigning the first criterion to a second bin;

detecting activation of a first switch of the first bin and of a second switch of the first bin, wherein the activation of the first switch indicates that a fill level of the first bin is nearing capacity and the activation of the second switch indicates that the fill level of the first bin has reached capacity; and calibrating the estimated remaining capacity based on the detected activation of the first switch and the second switch.

11. The method of claim 10, wherein the sorter system also reads sort data from each item and assigns the respective item to a bin based on the sort data matching the assigned sort criterion for that bin.

12. The method of claim 10, wherein the sorter system determines that the first bin is nearing a capacity threshold.

13. The method of claim 12, wherein the sorter system determines that the first bin is nearing the capacity threshold based on detecting activation of a first switch of the first bin, and the sorter system further determines that the first bin has reached capacity based on detecting activation of a second switch of the first bin.

14. The method of claim 12, wherein the sorter system determines that the first bin is nearing the capacity threshold based on an accumulated thickness of all items that have been transported to the first bin.

15. The method of claim 10, wherein when the first criterion is assigned to the second bin of the plurality of bins, the sorter system signals that the first bin is full.

16. The method of claim 10, wherein after the first criterion is assigned to the second bin of the plurality of bins, the sorter system assigns items to the second bin based on the first sort criterion.

17. The method of claim 10, wherein each of the items is either a flat or a parcel.

18. The method of claim 10, wherein when the sorter system detects the activation of the second switch of the first bin, the sorter system transports further items that are already in transport and assigned to the first bin to a reject bin.

* * * * *